United States Patent
Hori et al.

(10) Patent No.: US 11,734,967 B2
(45) Date of Patent: Aug. 22, 2023

(54) INFORMATION PROCESSING DEVICE, INFORMATION PROCESSING METHOD AND PROGRAM

(71) Applicant: TOYOTA JIDOSHA KABUSHIKI KAISHA, Toyota (JP)

(72) Inventors: Takashige Hori, Aisai (JP); Naoto Sasagawa, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 15/929,205

(22) Filed: Jan. 16, 2020

(65) Prior Publication Data
US 2020/0231147 A1 Jul. 23, 2020

(30) Foreign Application Priority Data
Jan. 23, 2019 (JP) .................. 2019-009755

(51) Int. Cl.
*G07C 5/00* (2006.01)
*B60W 30/095* (2012.01)
(Continued)

(52) U.S. Cl.
CPC ........ *B60W 30/0956* (2013.01); *B60W 30/09* (2013.01); *B60W 50/14* (2013.01); *G07C 5/008* (2013.01)

(58) Field of Classification Search
CPC .. B60W 30/0956; B60W 50/14; B60W 30/09; B60W 50/08–16; G07C 5/085;
(Continued)

(56) References Cited

U.S. PATENT DOCUMENTS

2013/0181850 A1* 7/2013 Emura .................. G08G 1/167
340/905
2014/0191858 A1* 7/2014 Morgan ............... G07C 5/0816
340/439

(Continued)

FOREIGN PATENT DOCUMENTS

JP 2013-33324 A 2/2013
JP 2014-10496 A 1/2014
(Continued)

*Primary Examiner* — Jeffrey C Boomer
(74) *Attorney, Agent, or Firm* — Oblon, McClelland, Maier & Neustadt, L.L.P.

(57) ABSTRACT

An information processing device includes: an accident/near miss detecting unit that detects a first vehicle of a plurality of vehicles based on vehicle information acquired by each of the vehicles and including position information and date-and-time information corresponding to time when the vehicle information is acquired by the vehicles, the first vehicle being involved in a near miss or accident; a surrounding vehicle extracting unit that extracts surrounding vehicles of the vehicles and the date-and-time information corresponding to the position information, the surrounding vehicles being positioned at an area surrounding the first vehicle at time of the near miss or accident; and an object vehicle specifying unit that specifies a second vehicle of the surrounding vehicles, the second vehicle being a vehicle in which an inadequate driving operation causing the near miss or accident of the first vehicle is performed.

11 Claims, 10 Drawing Sheets

(51) Int. Cl.
*B60W 50/14* (2020.01)
*B60W 30/09* (2012.01)
(58) Field of Classification Search
CPC .... G07C 5/008; G08G 1/0129; G08G 1/0137; G08G 1/166; G06Q 50/30
See application file for complete search history.

(56) References Cited

U.S. PATENT DOCUMENTS

| | | | |
|---|---|---|---|
| 2015/0199162 A1* | 7/2015 | Platz | G08G 1/0112 701/1 |
| 2016/0196098 A1* | 7/2016 | Roth | B60K 35/00 715/761 |

FOREIGN PATENT DOCUMENTS

| | | | |
|---|---|---|---|
| JP | 2016-071492 A | | 5/2016 |
| JP | 2016071492 | * | 5/2016 |
| JP | 2017-182490 A | | 10/2017 |

* cited by examiner

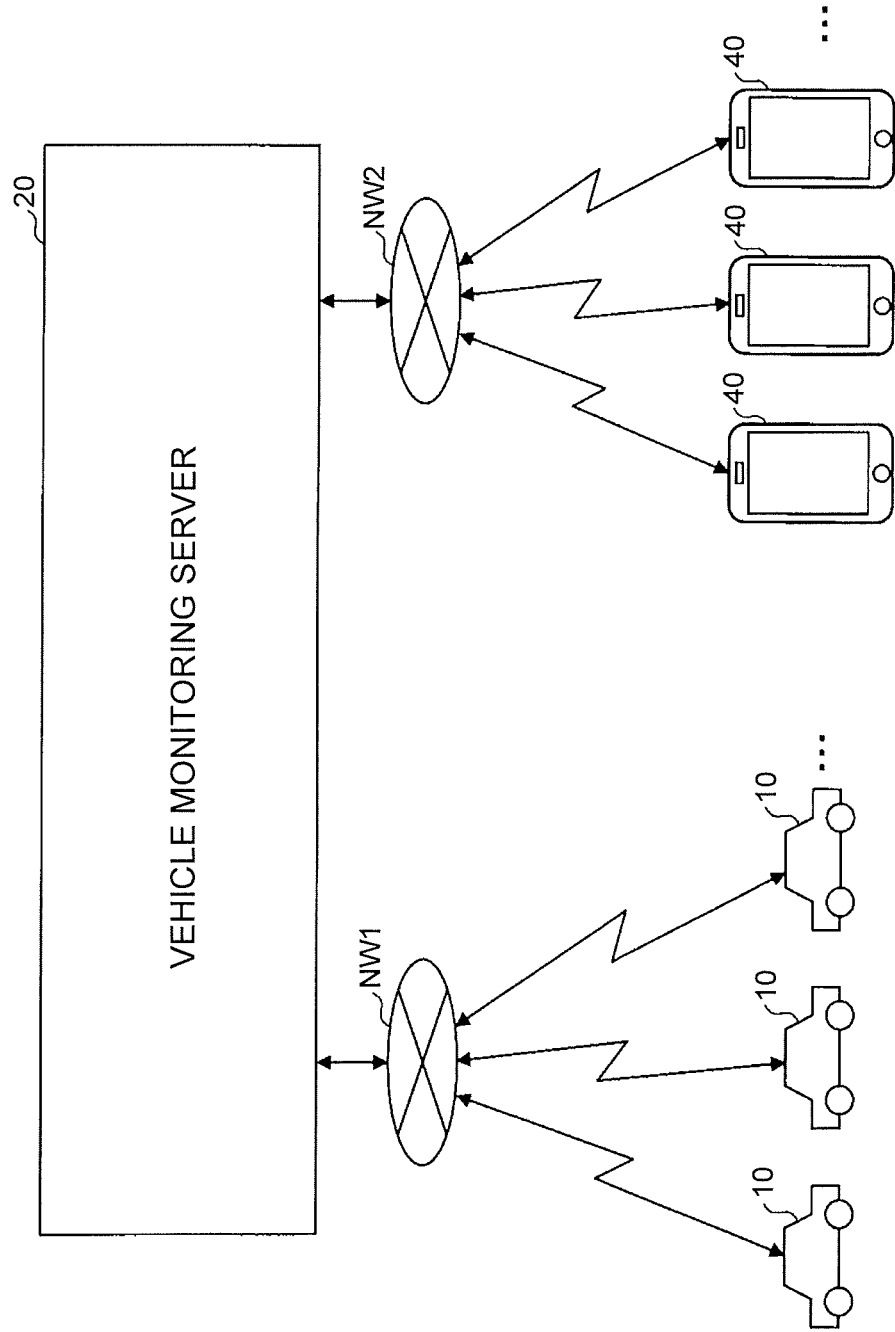

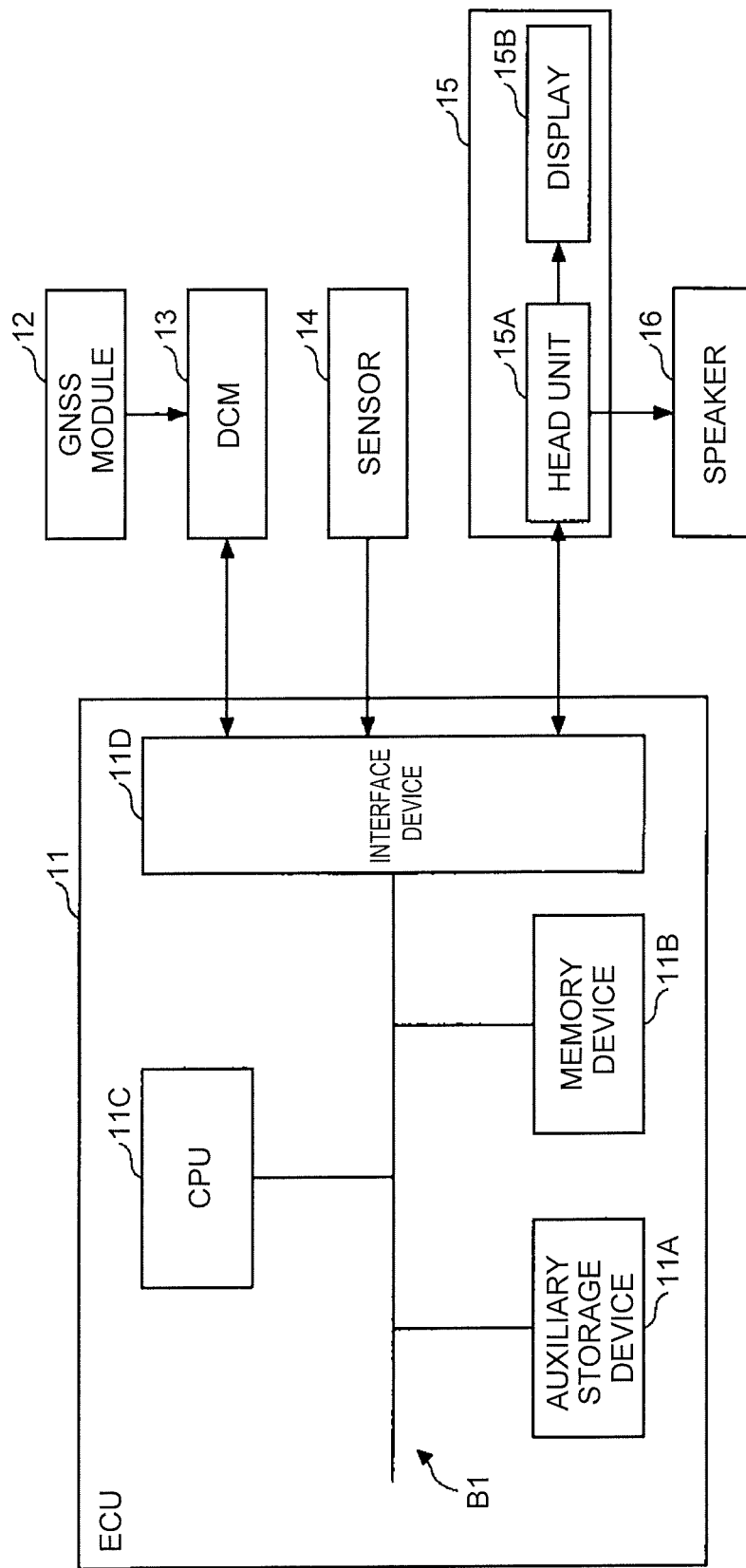

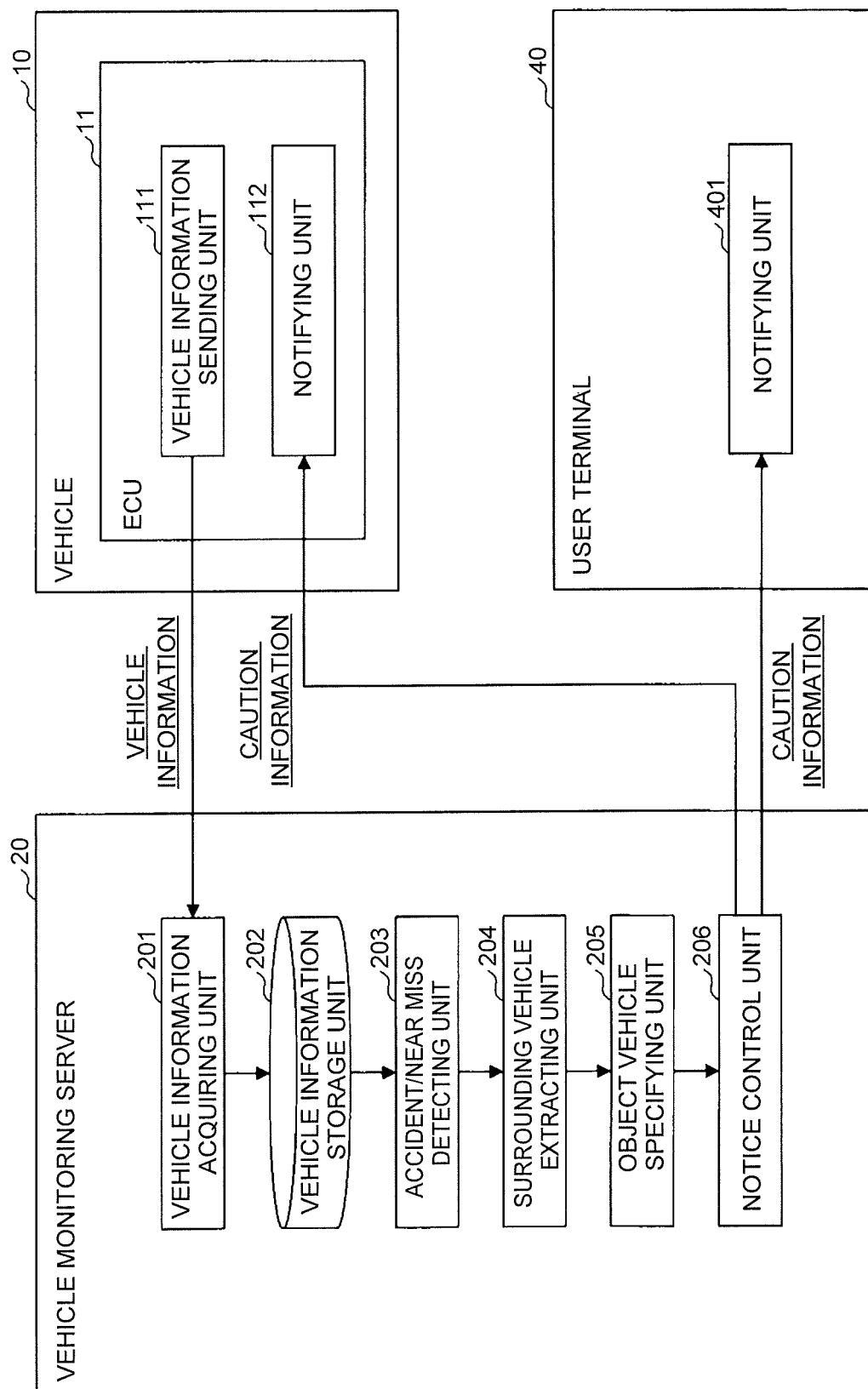

FIG. 5C
520
DATE AND TIME OF OCCURRENCE: 10/23 13:05:00 - 13:05:30
TROUBLED VEHICLE: SUDDEN BRAKING
CAUSE: SUDDEN CUTTING-IN
PLACE: 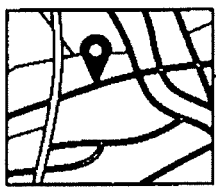 —521
PICTURE: 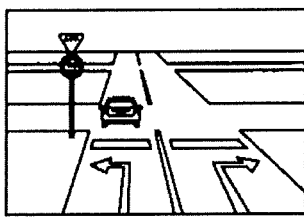 —522
ADVICE:
PERFORM LANE CHANGE AFTER CHECKING THAT THERE IS SUFFICIENT DISTANCE AND EXPRESSING YOUR INTENTION TO SURROUNDING VEHICLES WITH TURN SIGNAL

INFORMATION PROCESSING DEVICE, INFORMATION PROCESSING METHOD AND PROGRAM

INCORPORATION BY REFERENCE

The disclosure of Japanese Patent Application No. 2019-009755 filed on Jan. 23, 2019 including the specification, drawings and abstract is incorporated herein by reference in its entirety.

BACKGROUND

1. Technical Field

The disclosure relates to an information processing device and the like.

2. Description of Related Art

For example, there is known a technology of performing determination of occurrence of an accident or near miss of a vehicle, analysis of an occurrence cause, and the like, from common points between vehicle information collected from the vehicle and vehicle information accumulated about accidents and near misses that occurred in the past (see Japanese Patent Application Publication No. 2016-071492, for example).

SUMMARY

By an inadequate driving operation (for example, a steering operation corresponding to a sudden lane change or a forceful cutting into vehicles arrayed in a front-rear direction) in a certain vehicle, a different vehicle can be involved in a near miss or an accident. Therefore, from the standpoint of safety and the like, it is desirable to specify the vehicle in which such an inadequate driving operation has been performed and to perform some kind of reaction to a driver or the like of the vehicle.

However, in the above-described technology, although it is possible to detect a near miss or an accident of a certain vehicle, it is not possible to specify the vehicle in which the inadequate driving operation causing the near miss or the accident has been performed.

Hence, in view of the above problem, the disclosure has an object to provide an information processing device and the like that make it possible to specify the vehicle in which the inadequate driving operation has been performed.

For achieving the above object, an embodiment of the disclosure provides an information processing device including:

a detecting unit that detects a first vehicle of a plurality of vehicles based on predetermined vehicle information and date-and-time information, the first vehicle being involved in a near miss or an accident, the predetermined vehicle information being acquired by each of the plurality of vehicles and including position information, the date-and-time information corresponding to time when the vehicle information is acquired by the plurality of vehicles;

an extracting unit that extracts surrounding vehicles of the plurality of vehicles based on the position information and the date-and-time information, in a case where the first vehicle is detected by the detecting unit, the surrounding vehicles being positioned at an area surrounding the first vehicle when the first vehicle is involved in the near miss or the accident; and a specifying unit that specifies a second vehicle of the surrounding vehicles based on the vehicle information about the surrounding vehicles, the second vehicle being a vehicle in which a predetermined driving operation is performed, the predetermined driving operation causing the near miss or the accident of the first vehicle.

With the embodiment, the information processing device can know a motion state of the vehicle, a driving operation state by the driver, and the like, from the vehicle information acquired by each vehicle, and thereby, can detect occurrence of the near miss (for example, a sudden braking) or accident (for example, a collision) of the vehicle. Further, the information processing device can extract the surrounding vehicles positioned at the area surrounding the first vehicle when the first vehicle is involved in the near miss or the accident, from the position information (specifically, the position information about the first vehicle and the position information about the other vehicles) about each vehicle and the date-and-time information corresponding to the time when the vehicle information is acquired. Therefore, the information processing device can know the motion states of the surrounding vehicles, the driving operation states by the driver, and the like, from the extracted vehicle information about the surrounding vehicles, and thereby, can specify the second vehicle in which an inadequate driving operation corresponding to a cause of the near miss or accident of the first vehicle has been performed, from the extracted surrounding vehicles.

In the above embodiment, the information processing device may further include a notifying unit that gives a notice of a caution to a user of the second vehicle specified by the specifying unit, through a user terminal.

With the embodiment, the information processing device can perform the caution relevant to the inadequate driving operation causing the near miss or accident of the first vehicle, to the user of the second vehicle in which the inadequate driving operation has been performed.

In the above-described embodiment, in a case where the second vehicle is traveling, the notifying unit may give an auditory notice as the notice of the caution to the user that rides in the second vehicle, through an in-vehicle device of the second vehicle or a mobile terminal possessed by the user, each of the in-vehicle device and the mobile terminal being the user terminal, and in a case where the second vehicle is at a standstill, the notifying unit may give a visual notice as the notice of the caution to the user, through the in-vehicle device or the mobile terminal.

With the embodiment, the information processing device can give the auditory notice to the user of the second vehicle during traveling, so as not to obstruct the driving operation, and can give the visual notice to the user of the second vehicle at a standstill, so as to perform a more specific caution.

In the above-described embodiment, in a case where the second vehicle is in a stop state, the notifying unit may give the notice of the caution to the user of the second vehicle, through the user terminal different from an in-vehicle device of the second vehicle.

With the embodiment, the information processing device can perform the caution relevant to the inadequate driving operation to the user of the second vehicle, at such a timing that the driving operation of the second vehicle is not obstructed.

In the above-described embodiment, the detecting unit may successively perform the detection of the first vehicle in response to movement of the plurality of vehicles, the extracting unit and the specifying unit may respectively perform the extraction of the surrounding vehicles and the specification of the second vehicle, immediately in response to the detection of the first vehicle by the detecting unit, and in response to the specification of the second vehicle by the specifying unit, the notifying unit may give an auditory notice as the notice of the caution to the user of the second vehicle that rides in the second vehicle, through an in-vehicle device of the second vehicle or a mobile terminal possessed by the user, each of the in-vehicle device and the mobile terminal being the user terminal, at a first timing that is a relatively early timing after the first vehicle is involved in the near miss or the accident, and then may give a visual notice as the notice of the caution to the user that rides in the second vehicle, through the in-vehicle device or the mobile terminal, at a second timing that is a relatively late timing at which the second vehicle is at a standstill.

With the embodiment, the information processing device can perform a simplified caution to the user (driver) of the second vehicle, shortly after the accident or the near miss, even during traveling, and can perform a specific caution later, in the state where the second vehicle is at a standstill.

In the above-described embodiment, in a case where it is determined that the user is not looking at a content of the visual notice at the second timing, the notifying unit may give the visual notice to the user through the user terminal different from the in-vehicle device of the second vehicle, when the second vehicle gets into a stop state.

With the embodiment, even in the case where the user is not looking at the content of the notice during the driving of the second vehicle, the information processing device can perform again the specific caution to the user of the second vehicle, through the user terminal (for example, a smartphone) other than the in-vehicle device, after the stop of the second vehicle.

Other embodiments of the disclosure can be realized as an information processing method and a program.

The above-described embodiments can provide the information processing device and the like that make it possible to specify the vehicle in which the inadequate driving operation has been performed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a schematic diagram showing an example of a configuration of a vehicle monitoring system;

FIG. 2A is a diagram showing an example of a hardware configuration of a vehicle;

FIG. 3 is a functional block diagram showing an example of a functional configuration of the vehicle monitoring system;

FIG. 5C is a diagram showing an example of a detailed caution notice screen that is displayed on the display device of the user terminal.

DETAILED DESCRIPTION OF EMBODIMENTS

Figure 2B:
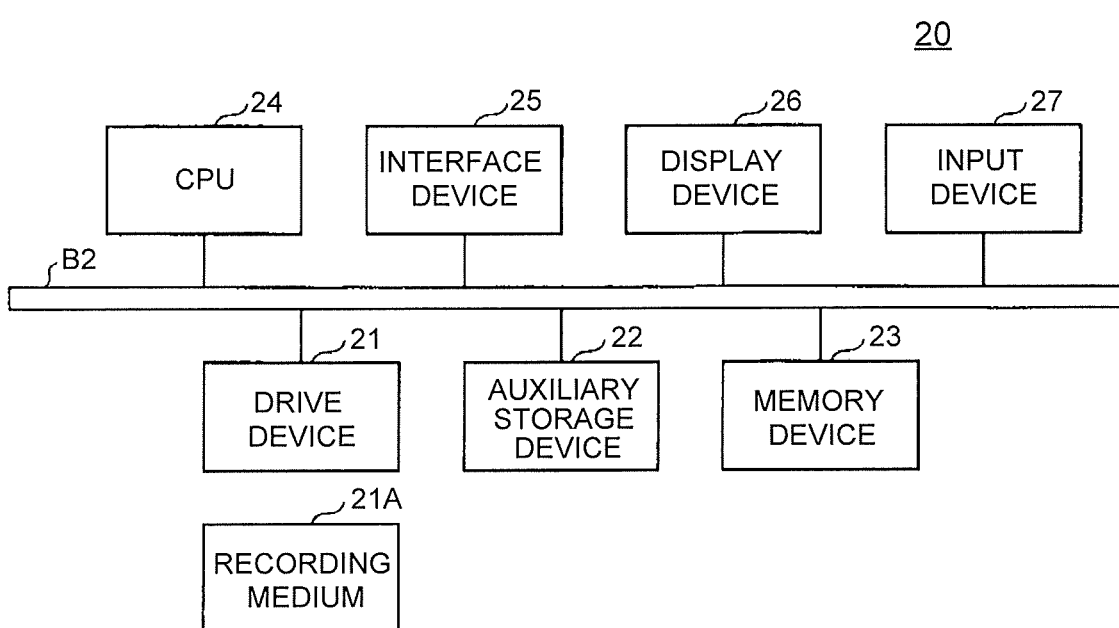
FIG. 2B is a diagram showing an example of a hardware configuration of a vehicle monitoring server.

Hereinafter, an embodiment of the disclosure will be described with reference to the drawings.

Outline of Vehicle Monitoring System

First, an outline of a vehicle monitoring system 1 according to the embodiment will be described with reference to FIG. 1.

The vehicle monitoring system 1 includes a plurality of vehicles 10, a vehicle monitoring server 20, and a plurality of user terminals 40.

The vehicle monitoring system 1 monitors various abnormalities of the plurality of vehicles 10, with the vehicle monitoring server 20. For example, with the vehicle monitoring server 20, the vehicle monitoring system 1 detects an accident or near miss of a vehicle 10, and in the case where a cause of the detected accident or near miss is an inadequate driving operation in a different vehicle 10, the vehicle monitoring system 1 gives a caution relevant to the inadequate driving operation, to a user (driver) of the different vehicle 10. Here, examples of the inadequate driving operation include a steering operation corresponding to a sudden lane change or a forceful cutting into vehicles arrayed in a front-rear direction, and a braking operation corresponding to an unnecessary sudden braking.

For example, the vehicle 10 is communicably connected with the vehicle monitoring server 20, through a communication network NW1 that can include a mobile communication network using base stations as terminals, a satellite communication network using overhead communication satellites, and an internet network. The vehicle 10 acquires a prescribed kind of dynamic information (hereinafter, referred to as "vehicle information") related to the vehicle 10 (own vehicle), and uploads (sends) the acquired vehicle information to the vehicle monitoring server 20, in response to a command from the vehicle monitoring server 20 or automatically at a prescribed timing. For example, the vehicle information includes information (hereinafter, referred to as "vehicle state information") relevant to various states of the vehicle 10 such as a position state of the vehicle 10, a motion state of the vehicle 10, an operation state of the vehicle 10 by a driver or the like, and a control state of the vehicle 10. Here, the vehicle state information includes position information about the vehicle 10. Further, the vehicle state information includes information (hereinafter, referred to as "vehicle motion state information") relevant to the motion state of the vehicle 10. Further, the vehicle state information may include information (hereinafter, referred to as "driving operation information") relevant to the driving operation of the vehicle 10. The "driving operation" means a driver's action to actively operate functions of the vehicle 10, as exemplified by "running", "turning" and "stopping", and specifically includes an operation of an accelerator pedal or alternative means for the accelerator pedal, an operation of a steering wheel or alternative means for the steering wheel, and an operation of a brake pedal or alternative means for the brake pedal. Further, for example, the vehicle information may include information relevant to an environment state of the periphery of the vehicle 10, as exemplified by the ambient temperature of the periphery of the vehicle 10 that is obtained by a temperature sensor, a rainfall state (specifically, existence of a raindrop and the amount of the raindrop) of the periphery of the vehicle 10 that is obtained by a rain sensor, and a traffic state of the periphery of the vehicle 10 that is obtained by an in-vehicle camera.

The vehicle monitoring server 20 (an example of the information processing device) is communicably connected with each of the plurality of vehicles 10, through the communication network NW1. For example, the vehicle monitoring server 20 is communicably connected with a plurality of user terminals 40, through a communication network NW2 that can include a mobile communication network using base stations as terminals, a satellite communication network using overhead communication satellites, and an internet network.

The vehicle monitoring server 20 receives the vehicle information that is sent from each of the plurality of vehicles 10, and accumulates the received vehicle information for each vehicle 10.

Further, for each of the plurality of vehicles 10, the vehicle monitoring server 20 detects occurrence of the accident or near miss of the vehicle 10, based on the vehicle information received from the vehicle 10. Then, in the case where the cause of the detected accident or near miss is an inadequate operation in a different vehicle 10, the vehicle monitoring server 20 gives the caution relevant to the inadequate driving operation, to the user (driver) of the different vehicle 10, through an in-vehicle device (for example, a later-described navigation device 15) of the different vehicle 10 or a user terminal 40 that is used by the user (driver) of the different vehicle 10.

The user terminal 40 is used by the user of the vehicle 10. For example, the user terminal 40 is a mobile terminal such as a smartphone, a mobile phone, a tablet terminal and a laptop computer. Further, for example, the user terminal 40 may be a stationary terminal such as a desktop computer. Further, for example, the user terminal 40 may be an in-vehicle device (in-vehicle terminal) equipped in the vehicle 10, as exemplified by the later-described navigation device 15 or an audio device.

The user terminal 40 is communicably connected with the vehicle monitoring server 20, through the communication network NW2. For example, the user terminal 40 gives a variety of information (for example, caution information relevant to the inadequate driving operation in the vehicle 10 that is used by the user of the user terminal 40) delivered from the vehicle monitoring server 20 to the user, by visual display or voice.

Configuration of Vehicle Monitoring System

Next, the configuration of the vehicle monitoring system 1 will be described with reference to FIG. 2A, FIG. 2B and FIG. 3, in addition to FIG. 1.

Each of FIG. 2A and FIG. 2B is a diagram showing an example of a hardware configuration of the vehicle monitoring system 1. Specifically, FIG. 2A is a diagram showing an example of a hardware configuration of the vehicle 10, and FIG. 2B is a diagram showing an example of a hardware configuration of the vehicle monitoring server 20. FIG. 3 is a functional block diagram showing an example of a functional configuration of the vehicle monitoring system 1.

A hardware configuration of the user terminal 40 is nearly the same as the hardware configuration of the vehicle monitoring server 20. Therefore, descriptions will be made below, with reference to FIG. 2B, and illustration of the hardware configuration of the user terminal 40 will be omitted. Hereinafter, in the description of the user terminal 40, reference characters "21", "21A", "22", "23", "24", "25", "26", "27" and "B2" in FIG. 2B are replaced with "41", "41A", "42", "43", "44", "45", "46", "47" and "B4", respectively.

Configuration of Vehicle

As shown in FIG. 2A, the vehicle 10 includes an ECU 11, a global navigation satellite system (GNSS) module 12, a data communication module (DCM) 13, a sensor 14, the navigation device 15, and a speaker 16.

The ECU 11 is an electronic control unit that performs various controls relevant to the vehicle 10. Functions of the ECU 11 may be realized by arbitrary hardware or combinations of hardware and software. For example, the ECU 11 may be constituted mainly by a microcomputer including an auxiliary storage device 11A, a memory device 11B, a central processing unit (CPU) 11C, an interface device 11D and the like, which are connected with each other by a bus B1.

For example, programs to realize various programs of the ECU 11 are provided by a dedicated tool that is connected with a predetermined connector (for example, a data link coupler (DLC)) for external connection by a detachable cable. The connector is joined to an in-vehicle network such as a controller area network (CAN) of the vehicle 10. In response to a predetermined operation of the dedicated tool, the programs are installed in the auxiliary storage device 11A of the ECU 11 from the dedicated tool through the cable, the connector and the in-vehicle network. Further, the programs may be installed in the auxiliary storage device 11A by being downloaded from another computer (for example, the vehicle monitoring server 20) through the communication network NW1.

The auxiliary storage device 11A, which is non-volatile storage means, contains the installed programs, and contains necessary files, necessary data and the like. For example, the auxiliary storage device 11A is a hard disk drive (HDD), a flash memory or the like.

When an activation instruction for a program is given, the memory device 11B reads the program from the auxiliary storage device 11A, and contains the program.

The CPU 11C executes the programs contained in the memory device 11B, and realizes various functions of the ECU 11 in accordance with the programs.

The interface device 11D, for example, is used as an interface for connection with the in-vehicle network and one-to-one connection with various sensors, various actuators and the like. The interface device 11D can include different kinds of interface devices, depending on objects to be connected.

The GNSS module 12 receives satellite signals sent from three or more satellites, preferably, four or more satellites over the vehicle 10, and thereby, measures the position of the vehicle 10 (own vehicle) equipped with the GNSS module 12. Positioning information of the GNSS module 12, that is, position information about the vehicle 10 is taken in the DCM 13, through a one-to-one communication line or the in-vehicle network, for example. The positioning information of the GNSS module 12 may be taken in the ECU 11 from the DCM 13 through the in-vehicle network or the like, for example.

The DCM 13, which is connected with the communication network NW1 in the exterior of the vehicle 10, is an exemplary communication device for communicating with an external device including the vehicle monitoring server 20 through the communication network NW1. The DCM 13 sends and receives various signals (for example, information signals, control signals and the like) to and from the vehicle monitoring server 20. The DCM 13 is communicably connected with the ECU 11 through the one-to-one communication line or the in-vehicle network such as the CAN. In response to requests from the ECU 11, the DCM 13 sends various signals to the exterior of the vehicle 10 (own vehicle), or outputs signals received from the exterior of the vehicle 10, to the ECU 11.

The sensor 14 outputs detection information corresponding to at least one of the driving operation information and motion state information about the vehicle 10. For example, the sensor 14 can include an accelerator pedal sensor that detects an operation state of the accelerator pedal of the vehicle 10, a brake pedal sensor that detects an operation state of the brake pedal, and a steering wheel sensor that detects an operation state of the steering wheel. Further, for example, the sensor 14 can include an acceleration sensor that detects the acceleration of the vehicle 10, and an angular velocity sensor (gyro sensor) that detects the angular velocity of the vehicle 10. The detection information output from the sensor 14 is taken in the ECU 11, through a one-to-one communication line or the in-vehicle network such as the CAN.

The navigation device 15 (an example of the user terminal or the in-vehicle device), which is equipped in a vehicle cabin of the vehicle 10, searches a route from the current place of the vehicle 10 to a destination to be set, and guides the driver of the vehicle 10 on a movement path along the route as the search result. The navigation device 15 includes a head unit 15A and a display 15B.

The head unit 15A is a principal unit that realizes the route search function and the route guide function. For example, the head unit 15A performs the route search, by a known method, based on position information corresponding to the current place of the vehicle 10 that is acquired by the GNSS module 12 and destination information that is input by an operation from the user. Further, the head unit 15A controls the display 15B and the speaker 16, to perform the route guide.

The route search function may be realized by an external navigation server. In this case, the head unit 15A may send information for the route search, as exemplified by the destination information input from the user, to the external navigation server, through the DCM 13, and may perform the route guide, using the display 15B and the speaker 16, based on information that is relevant to the route guide and that is sent back from the navigation server.

The display 15B displays information (for example, a map image, route information for the guide, and the like) relevant to the route guide, under control of the head unit 15A. Further, the display 15B displays various information images, under control of the head unit 15A based on a request from the ECU 11.

The speaker 16, which is equipped in the vehicle cabin of the vehicle 10, outputs sound under control of the head unit 15A.

As shown in FIG. 3, for example, the ECU 11 includes a vehicle information sending unit 111 and a notifying unit 112, as functional units that are realized when the CPU 11C executes one or more programs installed in the auxiliary storage device 11A.

For example, in a predetermined cycle (for example, in a cycle of several seconds to several tens of seconds), the vehicle information sending unit 111 acquires a prescribed kind of vehicle information or causes the DCM 13 to acquire the vehicle information, and sends the vehicle information to the vehicle monitoring server 20 through the DCM 13. The vehicle information to be sent to the vehicle monitoring server 20 includes the position information about the vehicle 10 that is obtained by the GNSS module 12. Further, the vehicle information to be sent to the vehicle monitoring server 20 includes the detection information of the sensor 14 that corresponds to at least one of the driving operation information and the motion state information. Specifically, to the vehicle monitoring server 20, the vehicle information sending unit 111 may send a signal including identification information (for example, the vehicle identification number (VIN) of the vehicle 10 or a vehicle identifier (ID) prescribed for each of the plurality of vehicles 10; hereinafter, referred to as "vehicle identification information") for specifying the vehicle 10 that is a sending source, information (for example, time stamp; hereinafter, referred to as "acquisition date-and-time information") relevant to the date and time of the acquisition of the vehicle information, and the vehicle information. Thereby, the vehicle monitoring server 20 can identify (specify) the vehicle 10 that is the sending source of the signal including the vehicle information, or can specify the date and time (acquisition timing) of the acquisition of the vehicle information, and the like.

The function of the vehicle information sending unit 111 may be transferred to the DCM 13.

The notifying unit 112 gives a variety of information (for example, the above-described caution information relevant to the inadequate driving operation) received from the vehicle monitoring server 20, to the user (driver) of the vehicle 10, through the display 15B or the speaker 16. Specifically, the notifying unit 112 controls the display 15B and the speaker 16, through the head unit 15A. Thereby, the notifying unit 112 displays an information image on the display 15B, and outputs voice information from the speaker 16. Details will be described later (see FIG. 4B).

Configuration of Vehicle Monitoring Server

Functions of the vehicle monitoring server 20 may be realized by arbitrary hardware or combinations of hardware and software. As shown in FIG. 2B, for example, the vehicle monitoring server 20 includes a drive device 21, an auxiliary storage device 22, a memory device 23, a CPU 24, an interface device 25, a display device 26, and input device 27, which are connected with each other by a bus B2.

For example, programs to realize various functions of the vehicle monitoring server 20 are by a portable recording medium 21A such as a compact disc read only memory (CD-ROM), a digital versatile disc read only memory (DVD-ROM) or a universal serial bus (USB) memory. When the recording medium 21A in which the programs are recorded are set in the drive device 21, the programs are installed in the auxiliary storage device 22 from the recording medium 21A through the drive device 21. Further, the programs may be downloaded from another computer through the communication network, and may be installed in the auxiliary storage device 22.

The auxiliary storage device 22 contains the installed various programs, and contains necessary files, necessary data and the like.

When an activation instruction for a program is given, the memory device 23 reads the program from the auxiliary storage device 22, and contains the program.

The CPU 24 executes the various programs contained in the memory device 23, and realizes various functions about the vehicle monitoring server 20 in accordance with the programs.

The interface device 25 is used as an interface for connection with communication networks (for example, the communication networks NW1, NW2).

For example, the display device 26 displays a graphical user interface (GUI) in accordance with programs that are executed by the CPU 24.

The input device 27 is used when an operator, an administrator or the like of the vehicle monitoring server 20 inputs various operation instructions relevant to the vehicle monitoring server 20.

As shown in FIG. 3, for example, the vehicle monitoring server 20 includes a vehicle information acquiring unit 201, an accident/near miss detecting unit 203, a surrounding vehicle extracting unit 204, an object vehicle specifying unit 205, and a notice control unit 206, as functional units that are realized when the CPU 24 executes one or more programs installed in the auxiliary storage device 22. The vehicle monitoring server 20 uses a vehicle information storage unit 202 and the like. For example, the vehicle information storage unit 202 can be realized using the auxiliary storage device 22 or an external storage device or the like that is communicably connected with the vehicle monitoring server 20.

The vehicle information acquiring unit 201 acquires the vehicle information included in the signal received from each of the plurality of vehicles 10, and stores (accumulates) the vehicle information in the vehicle information storage unit 202. Specifically, the vehicle information acquiring unit 201 stores the vehicle information received from the vehicle 10, in the vehicle information storage unit 202, as a record associated with the corresponding vehicle identification information and acquisition date-and-time information.

As described above, the vehicle information received from the vehicle 10 is stored in the vehicle information storage unit 202. Specifically, the vehicle information storage unit 202 may hold a record group (that is, a database) of the vehicle information acquired by the plurality of vehicles 10, by accumulating records including the vehicle identification information, the acquisition data-and-time information and the vehicle information. Further, the vehicle information storage unit 202 may be provided with a vehicle information storage unit dedicated for each of the plurality of vehicles 10, and may hold a history of records including the acquisition date-and-time information and the vehicle information for each vehicle 10, that is, a record group, in the corresponding vehicle information storage unit.

The accident/near miss detecting unit 203 (an example of the detecting unit) detects the vehicle 10 involved in an accident or a near miss, based on the vehicle information for each of the plurality of vehicles 10, which is information stored in the vehicle information storage unit 202. Examples of the accident to be detected include a collision with a different vehicle 10, a collision with a feature other than the vehicle 10, and an overturn (rollover) of the vehicle 10. Specifically, the accident/near miss detecting unit 203 is included in the vehicle information. Examples of the near miss to be detected include a sudden braking or sudden steering of the vehicle 10. The accident/near miss detecting unit 203 detects the vehicle 10 involved in the accident or the near miss, based on the motion state information (for example, information relevant to the acceleration and angular acceleration of the vehicle 10) and driving operation information about the vehicle 10. The accident/near miss detecting unit 203 may perform the detection of the vehicle 10 involved in the accident or the near miss, in real time, depending on a movement situation of the vehicle 10, or may perform the detection of the vehicle 10 involved in the accident or the near miss, as a batch process, at a decided cyclic timing. The same goes for the surrounding vehicle extracting unit 204, the object vehicle specifying unit 205 and the notice control unit 206, which operate when the accident/near miss detecting unit 203 detects the vehicle 10 involved in the accident or the near miss. Hereinafter, in the embodiment, descriptions will be made, assuming that the accident/near miss detecting unit 203 performs the detection of the vehicle 10 involved in the accident or the near miss in real time and the functions of the surrounding vehicle extracting unit 204, the object vehicle specifying unit 205 and the notice control unit 206 operate simultaneously in response to the detection in real time.

In the case where the accident/near miss detecting unit 203 has detected the vehicle 10 involved in the accident or the near miss, the surrounding vehicle extracting unit 204 (an example of the extracting unit) extracts vehicles 10 (hereinafter, referred to as "surrounding vehicles") that are positioned at an area (for example, an area within several meters to several tens of meters) surrounding the vehicle 10 (hereinafter, referred to as "detected vehicle") when the detected vehicle 10 is involved in the accident or the near miss, from the plurality of vehicles 10 other than the detected vehicle 10. Specifically, the surrounding vehicle extracting unit 204 extracts the surrounding vehicles from the plurality of vehicles 10 other than the detected vehicle, based on the position information about each of the plurality of vehicles 10 other than the detected vehicle when the detected vehicle is involved in the accident or the near miss. On this occasion, based on the acquisition date-and-time information of the record group in the vehicle information storage unit 202, the surrounding vehicle extracting unit 204 can acquire the record corresponding to the vehicle information (position information) when the detected vehicle is involved in the accident or the near miss, from the record group in the vehicle information storage unit 202.

The object vehicle specifying unit 205 (an example of the specifying unit) specifies a vehicle 10 (hereinafter, referred to as an "object vehicle") in which an inadequate driving operation causing the accident or near miss of the detected vehicle has been performed, from the surrounding vehicles extracted by the surrounding vehicle extracting unit 204. Naturally, there can be an accident or near miss of the detected vehicle that is caused by the detected vehicle itself, and therefore, in some cases, the object vehicle specifying unit 205 does not specify (cannot specify) the object vehicle.

In the case where the object vehicle specifying unit 205 has specified the object vehicle, the notice control unit 206 (an example of the notifying unit) sends, to the object vehicle (vehicle 10) or the user terminal 40, the caution information for giving a notice of a caution relevant to the inadequate driving operation to the user (driver) of the object vehicle. Thereby, the notice control unit 206 can perform the caution to the user of the object vehicle in which the inadequate driving operation has been performed, through the head unit 15A of the vehicle 10 or the user terminal 40. Details will be described later (see FIG. 4A, FIG. 5A and FIG. 6).

The functions of the accident/near miss detecting unit 203, the surrounding vehicle extracting unit 204, the object vehicle specifying unit 205 and the notice control unit 206 may be transferred to an external device (for example, another server device; an example of the information processing device) that can communicate with the vehicle monitoring server 20.

Configuration of User Terminal

Similarly to the vehicle monitoring server 20, functions of the user terminal 40 may be realized by arbitrary hardware or combinations of hardware and software. As shown in FIG. 2B, for example, the user terminal 40 includes a drive device 41, an auxiliary storage device 42, a memory device 43, a CPU 44, an interface device 45, a display device 46 and an input device 47, which are connected with each other by a bus B4.

A hardware configuration of the user terminal 40 is nearly the same as the hardware configurations of the vehicle monitoring server 20 and the like, and therefore, detailed descriptions will be omitted.

As shown in FIG. 3, for example, the user terminal 40 includes a notifying unit 401, as a functional unit that is realized when the CPU 44 executes one or more programs installed in the auxiliary storage device 42.

The notifying unit 401 gives a variety of information (for example, the above-described caution information relevant to the inadequate driving operation) received from the vehicle monitoring server 20, to the user (driver) of the vehicle 10, through the display device 46 or a speaker equipped in the user terminal 40. Specifically, the notifying unit 401 controls the display device 46 and the speaker. Thereby, the notifying unit 401 displays an information image on the display device 46, and outputs voice information from the speaker. Details will be described later (see FIG. 4C).

SPECIFIC EXAMPLES OF CAUTION METHOD RELEVANT TO INADEQUATE DRIVING OPERATION

Next, specific examples of the caution method relevant to the inadequate driving operation by the vehicle monitoring system 1 will be described with reference to FIGS. 4A to 4C, FIGS. 5A to 5C and FIG. 6.

First Example of Caution Method Relevant to Inadequate Driving Operation

In a first example, the caution relevant to the inadequate driving operation is performed to the user of the object vehicle, through the in-vehicle device (navigation device 15) of the object vehicle.

Figure 4A:
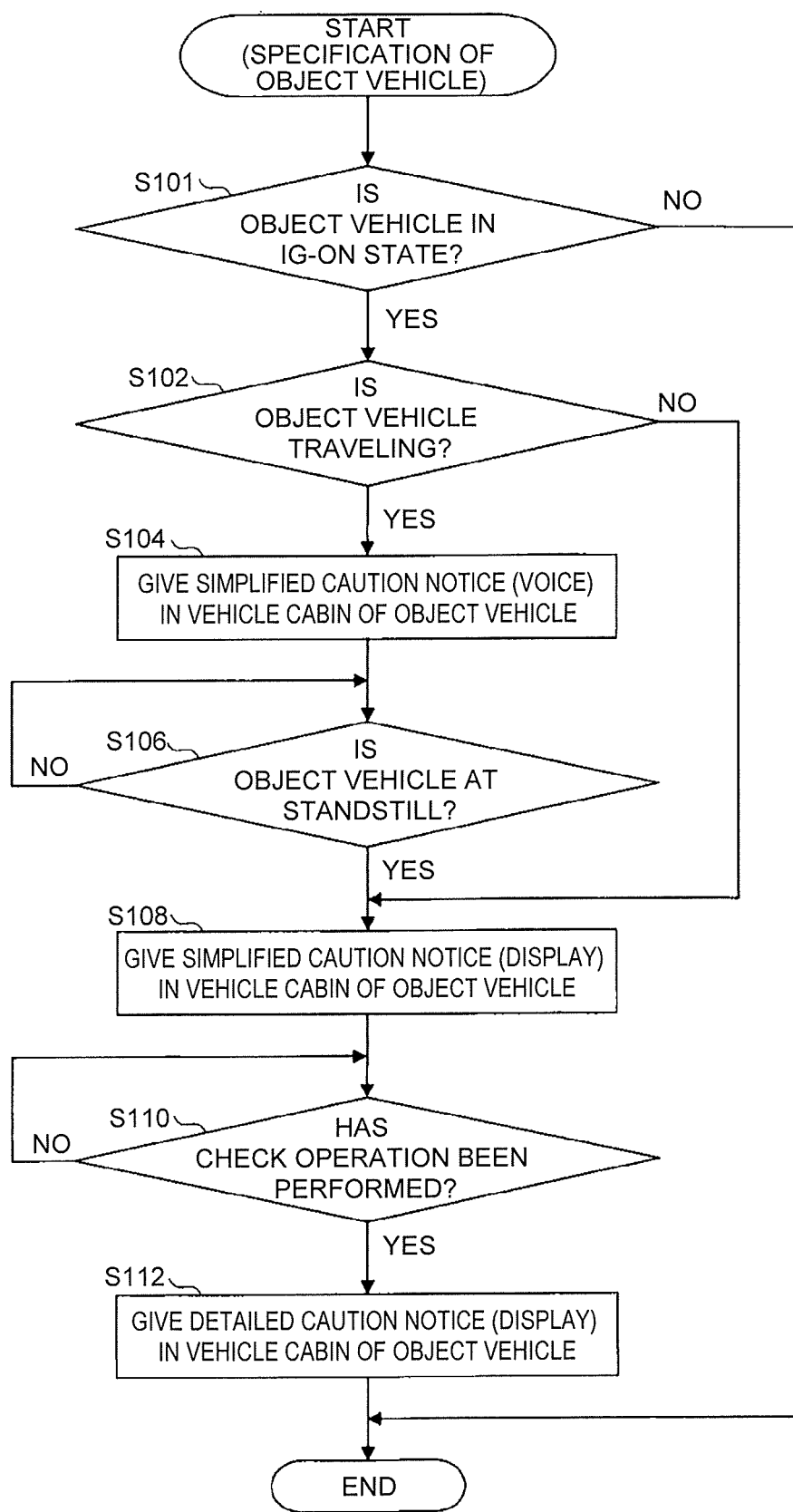
FIG. 4A is a diagram showing a first example of a caution notice process by the vehicle monitoring server.
Figure 4B:
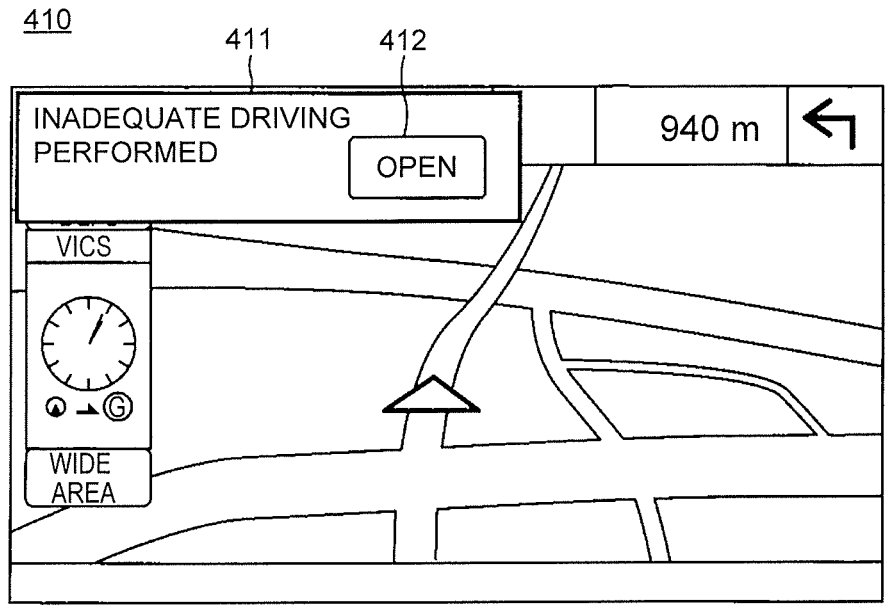
FIG. 4B is a diagram showing an example of a simplified caution notice screen that is displayed on a display of a vehicle.
Figure 4C:
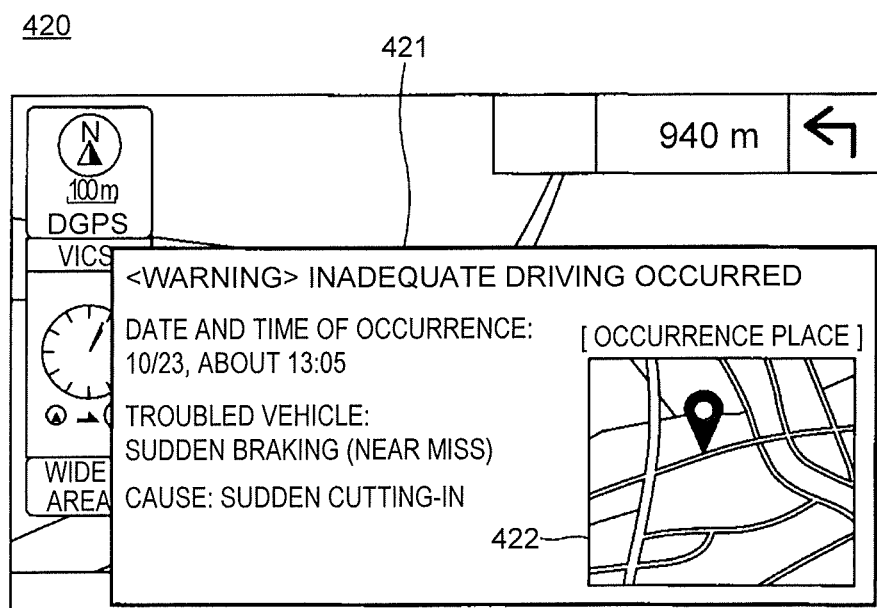
FIG. 4C is a diagram showing an example of a detailed caution notice screen that is displayed on the display of the vehicle.

FIG. 4A to FIG. 4C are diagrams for describing the first example of the caution method relevant to the inadequate driving operation by the vehicle monitoring server 20. Specifically, FIG. 4A is a flowchart schematically showing the first example of a notice process (hereinafter, referred to as a "caution notice process") for the caution relevant to the inadequate driving operation by the vehicle monitoring server 20. FIG. 4B is a diagram showing an example (simplified caution notice screen 410) of a screen (hereinafter, referred to as a "simplified caution notice screen") for giving simplified caution information that is displayed on the display 15B of the vehicle 10 (detected vehicle). FIG. 4C is a diagram showing an example (detailed caution notice screen 420) of a screen (hereinafter, referred to as a "detailed caution notice screen") for giving the caution information that is displayed on the display 15B of the vehicle 10 (detected vehicle).

The flowchart in FIG. 4A starts to be executed when the object vehicle specifying unit 205 has specified the object vehicle. The flowchart in FIG. 4A is forcibly terminated when the object vehicle is stopped, that is, ignition-off (hereinafter, referred to as "IG-OFF") is performed during execution of a process in or after step S104.

As shown in FIG. 4A, in step S101, the notice control unit 206 determines whether the object vehicle is in an ignition-on (hereinafter, referred to as "IG-ON") state (that is, whether the object vehicle has been activated such that the object vehicle can travel), based on the most recent vehicle information about the object vehicle in the vehicle information storage unit 202. For example, the notice control unit 206 may perform the determination from the acquisition date-and-time information of the most recent record about the object vehicle that is stored in the vehicle information storage unit 202. This is because the signal including the vehicle information is not uploaded from the object vehicle in the case of the stop of the object vehicle, that is, in the case of the IG-OFF. In the case where the object vehicle is in the IG-ON state, the notice control unit 206 proceeds to step S102, and in the case where the object vehicle is in the IG-OFF state, the notice control unit 206 ends this process.

In step S102, the notice control unit 206 determines whether the object vehicle is traveling, based on the most recent history of the position information about the object vehicle that is stored in the vehicle information storage unit 202. In the case where the object vehicle is traveling, the notice control unit 206 proceeds to step S104, and in the case where the object vehicle is at a standstill, the notice control unit 206 proceeds to step S108.

In step S104, the notice control unit 206 sends, to the object vehicle, caution information for performing a simplified caution to the user (driver) of the object vehicle by an auditory method. Thereby, the ECU 11 (notifying unit 112) of the object vehicle receives the caution information, and gives a notice (hereinafter, referred to as a "simplified caution notice") of the simplified caution, by causing the head unit 15A to output a predetermined warning sound or a predetermined voice from the speaker 16. That is, the notice control unit 206 causes the notifying unit 112 of the object vehicle to give the simplified caution notice to the user of the object vehicle by the auditory method. For example, the notifying unit 112 of the object vehicle may give the simplified caution notice relevant to the inadequate driving operation, with a voice such as "Your driving caused a sudden braking of another vehicle". Thereby, the notice control unit 206 can perform a minimal caution by the auditory method, so as not to interfere with the driving of the user (driver) of the object vehicle during traveling.

In step S106, the notice control unit 206 determines whether the object vehicle is continuously at a standstill, based on the most recent vehicle information (for example, the position information, vehicle speed information and the like) about the object vehicle that is stored in the vehicle information storage unit 202. For example, in the case where a predetermined number of most recent pieces of vehicle information indicate that the object vehicle is at standstill, the notice control unit 206 may determine that the object vehicle is continuously at a standstill. In the case where the object vehicle is continuously at a standstill, the notice control unit 206 proceeds to step S108, and in the case where the object vehicle is not continuously at a standstill, the notice control unit 206 waits until the standstill state is continued (that is, the notice control unit 206 repeats the process of step S106 until the standstill state is continued).

Between step S104 and step S106, a process of determining whether a predetermined time has elapsed since the occurrence of the accident or the near miss (that is, the occurrence of the inadequate driving operation) may be added similarly to step S304 in FIG. 6 described later.

In step S108, the notice control unit 206 sends, to the object vehicle, the caution information for performing the simplified caution to the user (driver) of the object vehicle by the auditory method. Thereby, the ECU 11 (notifying unit 112) of the object vehicle receives the caution information, and gives the simplified caution notice, by causing the head unit 15A to display the simplified caution notice screen on the display 15B. That is, the notice control unit 206 causes the notifying unit 112 of the object vehicle to give the simplified caution notice to the user of the object vehicle by the visual method.

For example, as shown in FIG. 4B, on the simplified caution notice screen 410, a pop-up 411 is displayed at an upper edge portion of a display region of the display 15B, so as to be superimposed on the display content.

The pop-up 411 contains textual information ("INADEQUATE DRIVING PERFORMED") indicating that the user of the object vehicle has performed an inadequate driving operation. Thereby, the user can recognize that there is a possibility that the user has performed the inadequate driving operation. Further, the pop-up 411 contains an opening icon 412 for checking detailed caution information from the vehicle monitoring server 20 (notice control unit 206). Thereby, the user can display the detailed caution information on the display 15B, by operating the opening icon 412 through predetermined operation input means (for example, a touch panel mounted on the display 15B.) attached to the navigation device 15.

Back to FIG. 4A, in step S110, the notice control unit 206 determines whether an operation (hereinafter, referred to as a "check operation") for checking the detailed caution information (for example, an operation of the opening icon 412 on the simplified caution notice screen 410) has been performed on the simplified caution notice screen. On this occasion, the notice control unit 206 may perform the determination by making an inquiry to the ECU 11 (notifying unit 112) of the object vehicle about whether the check operation has been performed, or may perform the determination based on information that is relevant to whether the check operation has been performed and that is automatically uploaded from the notifying unit 112. In the case where the check operation has been performed, the notice control unit 206 proceeds to step S112, and in the case where the check operation has not been performed, the notice control unit 206 waits until the check operation is performed (that is, the notice control unit 206 repeats the process of step S110).

In step S112, the notice control unit 206 sends, to the object vehicle, the caution information for performing the detailed caution to the user (driver) of the object vehicle by the visual method, and then ends this process. Thereby, the ECU 11 (notifying unit 112) of the object vehicle receives the caution information, and gives a notice (hereinafter, referred to as a "detailed caution notice") of the detailed caution, by causing the head unit 15A to display the detailed caution notice screen on the display 15B. That is, the notice control unit 206 causes the notifying unit 112 of the object vehicle to give the detailed caution notice to the user of the object vehicle by the visual method.

For example, as shown in FIG. 4C, on the detailed caution notice screen 420, a pop-up 421 is displayed so as to be superimposed on the display content of the display 15B and cover a large portion of the display content. The pop-up 421 contains information ("<WARNING> INADEQUATE DRIVING OCCURRED") indicating that an inadequate driving operation has been performed, the date and time ("10/23, ABOUT 13:05") of the occurrence, the content (SUDDEN BRAKING) of a trouble due to the inadequate driving operation, the content (SUDDEN CUTTING-IN) of the inadequate driving operation, and the like. Further, the pop-up 421 contains the place of the occurrence of the accident or the near miss, in other words, a map image 422 corresponding to the place of the occurrence of the inadequate driving operation in the object vehicle. Thereby, the user can know the date and time of the occurrence of the inadequate driving operation by the user, the place of the occurrence, the content of the inadequate driving operation, and the like, and can look back on the user's driving operation at that time. Further, the user can know the content of the trouble due to the inadequate driving operation, and can recognize the generation of the actual trouble due to the driving operation at that time. Therefore, the vehicle monitoring server 20 can perform the detailed caution relevant to the inadequate driving operation to the user of the object vehicle, through the detailed caution notice screen 420, when the object vehicle is at a standstill.

Between step S104 and step S106, a process of determining whether a predetermined time has elapsed since the occurrence of the accident or the near miss (that is, the occurrence of the inadequate driving operation) may be added similarly to step S304 in FIG. 6 described later. Thereby, as described later, it is possible to delay the timing when the visual caution is performed to the user, from the occurrence of the inadequate driving operation, to some extent. Further, in the case where the user terminal 40 is a mobile terminal possessed by the user of the object vehicle, a sequence of the caution notice process in FIG. 4A may be performed such that the caution to the user of the object vehicle is realized through the user terminal 40. That is, the simplified caution notice by the auditory method in step S104 may be performed through the speaker of the user terminal 40, and the simplified caution notice and detailed caution notice by the visual method in step S108 and step S112 may be performed through the display device 46 of the user terminal 40. Further, the sequence of the caution notice process in FIG. 4A may be autonomously performed by the ECU 11 (notifying unit 112) of the object vehicle or the user terminal 40 (notifying unit 401) possessed by the user of the object vehicle, based on the caution information received from the vehicle monitoring server 20 (notice control unit 206).

Second Example of Caution Method Relevant to Inadequate Driving Operation

In a second example, the caution is performed to the user of the object vehicle, through the user terminal 40 that is used by the user of the object vehicle.

Figure 5A:
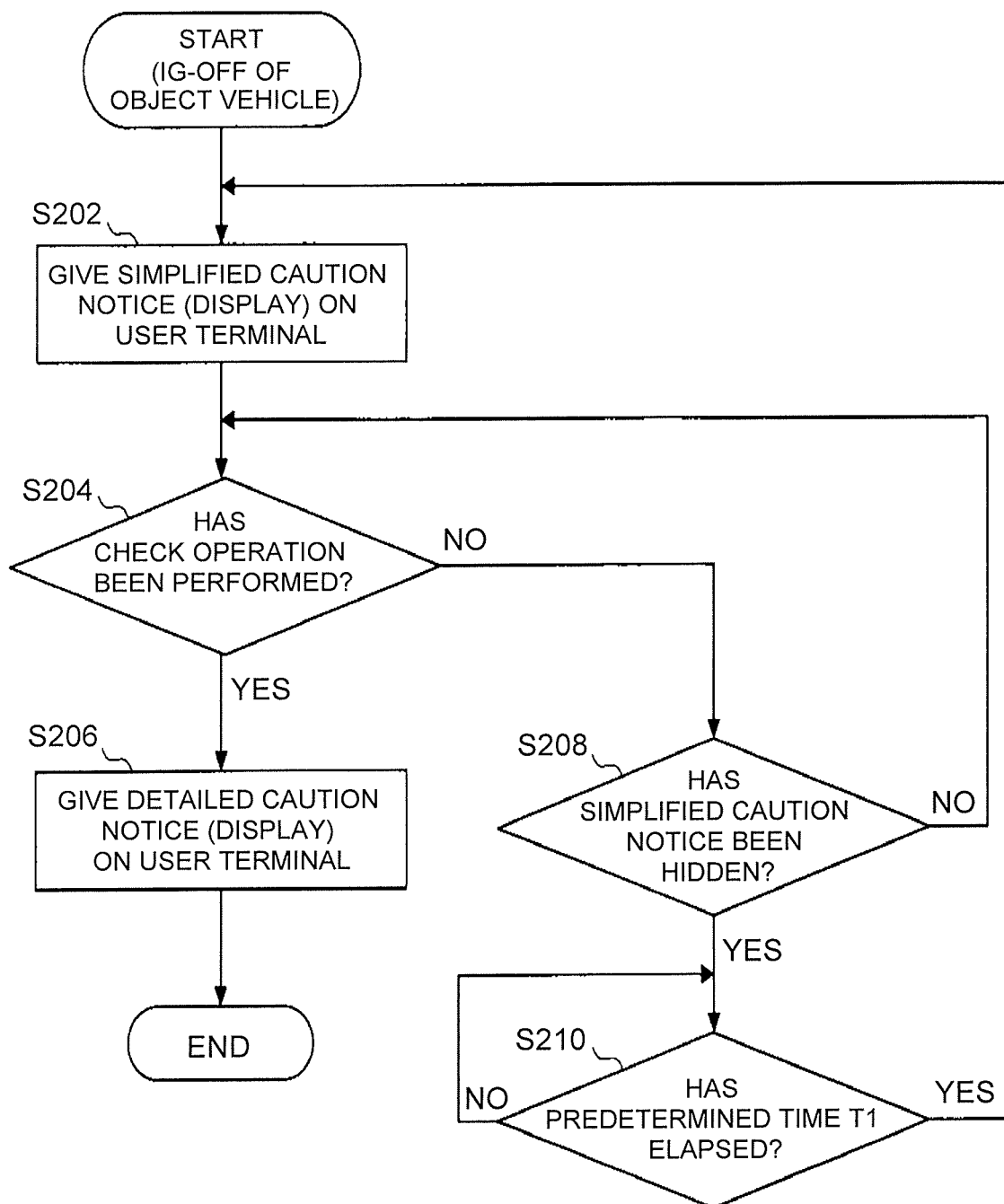
FIG. 5A is a flowchart schematically showing a second example of the caution notice process by the vehicle monitoring server.
Figure 5B:
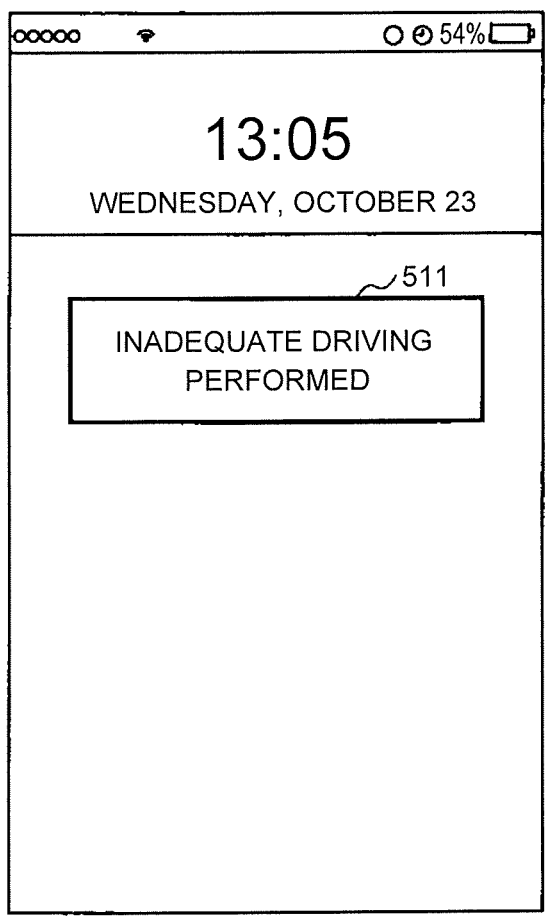
FIG. 5B is a diagram showing an example of a simplified caution notice screen that is displayed on a display device of a user terminal.

FIG. 5A to FIG. 5C are diagrams for describing the second example of the caution method relevant to the inadequate driving operation by the vehicle monitoring server 20. Specifically, FIG. 5A is a flowchart schematically showing the second example of the caution notice process relevant to the inadequate driving operation by the vehicle monitoring server 20. FIG. 5B is a diagram showing an example (simplified caution notice screen 510) of a simplified caution notice screen to be displayed on the display device 46 of the user terminal 40 that is used by the user of the object vehicle. FIG. 5C is a diagram showing an example (detailed caution notice screen 520) of a detailed caution notice screen to be displayed on the display device 46 of the user terminal 40 that is used by the user of the object vehicle.

For example, the flowchart in FIG. 5A starts to be executed when the IG-OFF of the object vehicle is performed after the object vehicle is specified by the object vehicle specifying unit 205.

As shown in FIG. 5A, in step S202, to the user terminal 40 that is used by the user of the object vehicle, the notice control unit 206 sends the caution information for performing the simplified caution to the user of the object vehicle by the visual method. Thereby, the user terminal 40 (notifying unit 401) that is used by the user of the object vehicle receives the caution information, and displays the simplified caution notice screen on the display device 46. That is, the notice control unit 206 causes the notifying unit 401 of the user terminal 40 to give the simplified caution notice to the user of the object vehicle by the visual method. Specifically, association information associated with identification information (for example, a user ID specific to the user; hereinafter, referred to as "user identification information") about the user, the vehicle identification information about the vehicle 10 that is used by the user, and identification information (for example, international mobile equipment identity (IMEI); hereinafter, referred to as "terminal identification information") about the user terminal 40 that is used by the user may be previously registered in the auxiliary storage device 22 of the vehicle monitoring server 20, or the like. Thereby, the notice control unit 206 can specify the user terminal 40 that is used by the user of the object vehicle, based on the association information, and can send the caution information to the specified user terminal 40.

For example, as shown in FIG. 5B, on the simplified caution notice screen 510, a pop-up 511 is displayed at a center portion of a display region of the display device 46, so as to be superimposed on the display content.

The pop-up 511 contains textual information ("INADEQUATE DRIVING PERFORMED") indicating that the user of the user terminal 40, that is, the user of the object vehicle has performed an inadequate driving operation. Thereby, the user can recognize that there is a possibility that the user has performed the inadequate driving operation.

The pop-up 511 is also a virtual operation object for checking the detailed caution information from the vehicle monitoring server 20 (notice control unit 206). Thereby, the user can display the detailed caution information on the display device 46, for example, by operating the pop-up 511 through the input device 47 such as a touch panel mounted on the display device 46.

Back to FIG. 5A, in step S204, the notice control unit 206 determines whether an operation for checking the detailed caution information (for example, an operation of the pop-up 511 on the simplified caution notice screen 510) has been performed on the simplified caution notice screen. On this occasion, the notice control unit 206 may perform the determination by making an inquiry to the user terminal 40 (notifying unit 401) about whether the check operation has been performed, or may perform the determination based on information that is relevant to whether the check operation has been performed and that is automatically uploaded from the notifying unit 401. The same goes for a determination process in step S208. In the case where the check operation has been performed, the notice control unit 206 proceeds to step S206, and in the case where the check operation has not been performed, the notice control unit 206 proceeds to step S208.

In step S206, to the user terminal 40 that is used by the user of the object vehicle, the notice control unit 206 sends the caution information for performing the detailed caution to the user of the object vehicle by the visual method, and then ends this process. Thereby, the user terminal 40 (notifying unit 401) receives the caution information, and displays the detailed caution notice screen on the display device 46. That is, the notice control unit 206 causes the notifying unit 401 of the user terminal 40 to give the detailed caution notice to the user of the object vehicle by the visual method. Thereby, the notice control unit 206 can perform the detailed caution relevant to the inadequate driving operation to the user of the object vehicle, at the timing when the user is not driving the object vehicle, that is, without interfering with the driving of the object vehicle by the user.

For example, as shown in FIG. 5C, the detailed caution notice screen 520 contains the date and time ("10/23, 13:05:00-13:05:30") of the occurrence of the inadequate driving operation, the content (SUDDEN BRAKING) of a trouble due to the inadequate driving operation, the content (SUDDEN CUTTING-IN) of the inadequate driving operation, and an advice ("PERFORM LANE CHANGE AFTER CHECKING THAT THERE IS SUFFICIENT DISTANCE AND EXPRESSING YOUR INTENTION TO SURROUNDING VEHICLES WITH TURN SIGNAL") relevant to the driving operation. Further, the detailed caution notice screen 520 contains the place of the occurrence of the accident or the near miss, in other words, a map image 521 corresponding to the place of the occurrence of the inadequate driving operation in the object vehicle, and a picture 522 of the object vehicle at the time of the inadequate driving operation. The picture 522 is image information of the in-vehicle camera at the time of the occurrence of the accident or the near miss, and is uploaded from the surrounding vehicles. The picture 522 may be played back by an operation through the input device 47. Thereby, the user can know the date and time of the occurrence of the inadequate driving operation by the user, the place of the occurrence, the content of the inadequate driving operation, the picture at that time, the advice relevant to the driving operation, and the like, can look back on the user's driving operation at that time, and can improve the driving operation in the future. Further, the user can know the content of the trouble due to the inadequate driving operation, and can recognize the generation of the actual trouble due to the driving operation at that time. Therefore, the vehicle monitoring server 20 can perform the detailed caution relevant to the inadequate driving operation to the user of the object vehicle, through the detailed caution notice screen 520 on the user terminal 40, without interfering with the driving of the object vehicle by the user.

Back to FIG. 5A, in step S208, the notice control unit 206 determines whether the simplified caution notice has been hidden by a user's operation through the input device 47. In the case where the simplified caution notice has been hidden, the notice control unit 206 proceeds to step S210, and in the case where the simplified caution notice has not been hidden, the notice control unit 206 returns to step S204.

In step S210, the notice control unit 206 determines whether a predetermined time T1 (for example, ten minutes) has elapsed since the hiding of the simplified caution notice. In the case where the predetermined time T1 has not elapsed, the notice control unit 206 waits until the elapse of the predetermined time T1 (that is, the notice control unit 206 repeats the process of step S210 until the elapse of the predetermined time T1), and in the case where the predetermined time T1 has elapsed, the notice control unit 206 returns to step S202, to display the simplified caution notice screen on the display device 46 again. Thereby, even when the user has hidden the simplified caution notice without checking the detailed caution notice, the vehicle monitoring server 20 can display the simplified caution notice screen on the display device 46 again, and can provide an opportunity to perform the detailed caution relevant to the inadequate driving operation to the user of the object vehicle.

A sequence of the caution notice process in FIG. 5A may be autonomously performed by the user terminal 40 (notifying unit 401) that is used by the user of the object vehicle, based on the caution information received from the vehicle monitoring server 20 (notice control unit 206).

Third Example of Caution Method Relevant to Inadequate Driving Operation

In a third example, the caution relevant to the inadequate driving operation is performed to the user of the object vehicle, using both the in-vehicle device of the object vehicle and the user terminal 40 that is used by the user of the object vehicle.

Figure 6:
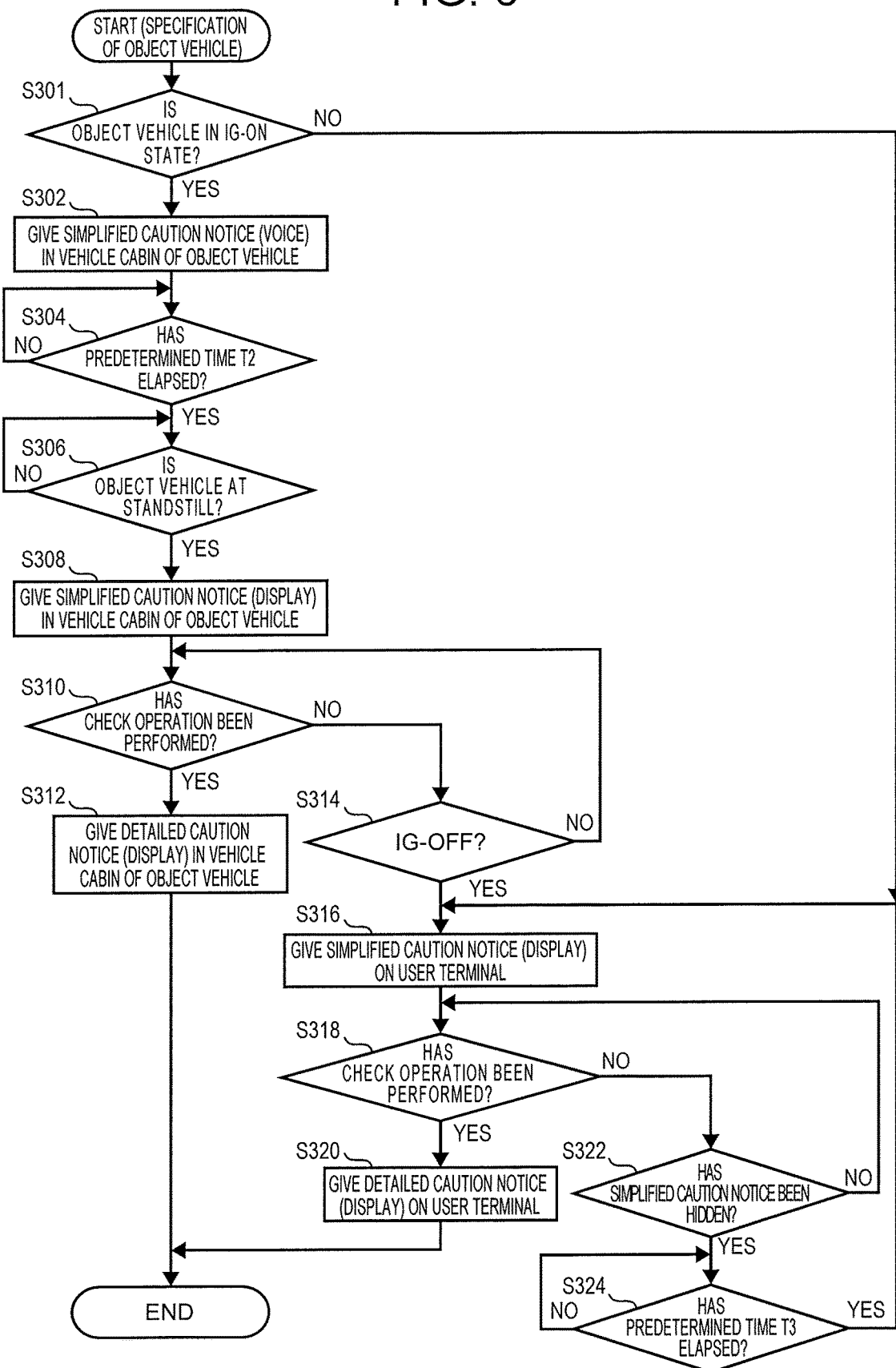
FIG. 6 is a flowchart schematically showing a third example of the caution notice process by the vehicle monitoring server.

FIG. 6 is a diagram for describing the third example of the caution method relevant to the inadequate driving operation by the vehicle monitoring server 20. Specifically, FIG. 6 is a flowchart schematically showing the third example of the caution notice process relevant to the inadequate driving operation by the vehicle monitoring server 20. For example, the flowchart starts to be executed when the object vehicle specifying unit 205 has specified the object vehicle.

As shown in FIG. 6, in step S301, the notice control unit 206 determines whether the object vehicle is in the IG-ON state (that is, whether the object vehicle has been activated such that the object vehicle can travel), based on the most recent vehicle information about the object vehicle in the vehicle information storage unit 202. In the case where the object vehicle is in the IG-ON state, the notice control unit 206 proceeds to step S302, and in the case where the object vehicle is in the IG-OFF state, the notice control unit 206 proceeds to step S316.

In step S302, the notice control unit 206 sends, to the object vehicle, the caution information for performing the simplified caution to the user (driver) of the object vehicle by the auditory method, similarly to step S104 in FIG. 4A. That is, the notice control unit 206 causes the notifying unit 112 of the object vehicle to give the simplified caution notice to the user of the object vehicle by the auditory method. Thereby, the notice control unit 206 can perform a minimal caution by the auditory method, immediately after the inadequate driving operation, so as not to interfere with the driving of the user (driver) of the object vehicle that is likely to be in the traveling state.

In step S304, the notice control unit 206 determines whether a predetermined time T2 (for example, ten minutes) has elapsed since the occurrence of the accident or the near miss (that is, the occurrence of the inadequate driving operation). In the case where the predetermined time T2 has elapsed, the notice control unit 206 proceeds to step S306, and in the case where the predetermined time T2 has elapsed, the notice control unit 206 waits until the elapse of the predetermined time T2 (that is, the notice control unit 206 repeats the process of step S304).

The process of step S304 may be skipped.

In step S306, the notice control unit 206 determines whether the object vehicle is continuously at a standstill, based on the most recent vehicle information about the object vehicle that is stored in the vehicle information storage unit 202, similarly to step S106 in FIG. 4A. In the case where the object vehicle is continuously at a standstill, the notice control unit 206 proceeds to step S308, and in the case where the object vehicle is not continuously at a standstill, the notice control unit 206 waits until the standstill state is continued (that is, the notice control unit 206 repeats the process of step S306 until the standstill state is continued).

In step S308, the notice control unit 206 sends, to the object vehicle, the caution information for performing the simplified caution to the user (driver) of the object vehicle by the visual method, similarly to step S108 in FIG. 4A. That is, the notice control unit 206 causes the notifying unit 112 of the object vehicle to give the simplified caution notice to the user of the object vehicle by the visual method. For example, the simplified caution notice screen 410 in FIG. 4B is displayed on the display 15B of the object vehicle, similarly to the above-described first example. Thereby, the user can recognize that there is a possibility that the user has performed the inadequate driving operation.

In step S310, the notice control unit 206 determines whether the check operation for the detailed caution information has been performed on the simplified caution notice screen, similarly to step S110 in FIG. 4A. In the case where the check operation has been performed, the notice control unit 206 proceeds to step S312, and in the case where the check operation has not been performed, the notice control unit 206 proceeds to step S314.

In step S312, the notice control unit 206 sends, to the object vehicle, the caution information for performing the detailed caution to the user (driver) of the object vehicle by the visual method, similarly to step S112 in FIG. 4A, and then ends this process. That is, the notice control unit 206 causes the notifying unit 112 of the object vehicle to give the detailed caution notice to the user of the object vehicle by the visual method. For example, the detailed caution notice screen 420 in FIG. 4C is displayed on the display 15B of the object vehicle, similarly to the above-described first example. Thereby, the notice control unit 206 can perform the detailed caution relevant to the inadequate driving operation, to the user of the object vehicle, at a timing when a certain amount of time has elapsed since the occurrence of the inadequate driving operation. Therefore, the user of the object vehicle can look back on the inadequate driving operation by the user, after the user settles down to some extent.

Meanwhile, in step S314, the notice control unit 206 determines whether the IG-OFF of the object vehicle has been performed (that is, whether the object vehicle has been stopped), based on the most recent vehicle information about the object vehicle in the vehicle information storage unit 202. In the case where the IG-OFF of the object vehicle has been performed, the notice control unit 206 proceeds to step S316, and in the case where the IG-OFF of the object vehicle has not been performed, the notice control unit 206 returns to step S310.

In step S316, to the user terminal 40 that is used by the user of the object vehicle, the notice control unit 206 sends the caution information for performing the simplified caution to the user of the object vehicle by the visual method, similarly to step S202 in FIG. 5A. Thereby, the user terminal 40 (notifying unit 401) that is used by the user of the object vehicle receives the caution information, and displays the simplified caution notice screen on the display device 46. That is, the notice control unit 206 causes the notifying unit 401 of the user terminal 40 to give the detailed caution notice to the user of the object vehicle by the visual method. For example, the simplified caution notice screen 510 is displayed on the display device 46 of the user terminal 40 that is used by the user of the object vehicle, similarly to the above-described second example. Thereby, the user can recognize that there is a possibility that the user has performed the inadequate driving operation.

In step S318, the notice control unit 206 determines whether the check operation for the detailed caution information has been performed on the simplified caution notice screen, similarly to step S204 in FIG. 5A. In the case where the check operation has been performed, the notice control unit 206 proceeds to step S320, and in the case where the check operation has not been performed, the notice control unit 206 proceeds to step S322.

In step S320, to the user terminal 40 that is used by the user of the object vehicle, the notice control unit 206 sends the caution information for performing the detailed caution to the user of the object vehicle by the visual method, similarly to step S206 in FIG. 5A, and then ends this process. That is, the notice control unit 206 causes the notifying unit 401 of the user terminal 40 to give the detailed caution notice to the user of the object vehicle by the visual method. For example, the detailed caution notice screen 520 is displayed on the display device 46 of the user terminal 40, similarly to the above-described second example. Thereby, in a situation where the user of the object vehicle has stopped the object vehicle (IG-OFF) without looking at the detailed caution notice screen through the display 15B of the object vehicle, the notice control unit 206 can perform again the detailed caution relevant to the inadequate driving operation to the user of the object vehicle, through the user terminal 40. Further, the notice control unit 206 performs again the detailed caution, only in the situation where the user of the object vehicle has stopped the object vehicle without looking at the detailed caution notice screen through the display 15B of the object vehicle. Therefore, the notice control unit 206 can prevent the caution from being performed twice, and can prevent the user from having a feeling of discomfort.

Meanwhile, in step S322, the notice control unit 206 determines whether the simplified caution notice has been hidden by a user's operation through the input device 47, similarly to step S208 in FIG. 5A. In the case where the simplified caution notice has been hidden, the notice control unit 206 proceeds to step S324, and in the case where the simplified caution notice has not been hidden, the notice control unit 206 returns to step S318.

In step S324, the notice control unit 206 determines whether a predetermined time T3 (for example, ten minutes) has elapsed since the hiding of the simplified caution notice, similarly to step S210 in FIG. 5A. In the case where the predetermined time T3 has not elapsed, the notice control unit 206 waits until the elapse of the predetermined time T3 (that is, the notice control unit 206 repeats the process of S324 until the elapse of the predetermined time T3). In the case where the predetermined time T3 has elapsed, the notice control unit 206 returns to step S316, and displays the simplified caution notice screen on the display device 46 again. Thereby, even when the user has hidden the simplified caution notice without checking the detailed caution notice, the vehicle monitoring server 20 can display the simplified caution notice screen on the display device 46 again, and can provide an opportunity to perform the detailed caution relevant to the inadequate driving operation to the user of the object vehicle.

Operation of Embodiment

Next, the operation of the vehicle monitoring system 1 (vehicle monitoring server 20) according to the embodiment will be described.

In the embodiment, the accident/near miss detecting unit 203 detects a first vehicle 10 that is of the plurality of vehicles 10 and that is involved in the near miss or the accident, based on the predetermined vehicle information acquired by each of the plurality of vehicles 10 and including the position information and the date-and-time information (acquisition date-and-time information) corresponding to the time when the vehicle information is acquired by the plurality of vehicles 10. In the case where the first vehicle 10 is detected by the accident/near miss detecting unit 203, the surrounding vehicle extracting unit 204 extracts the surrounding vehicles that are of the plurality of vehicles 10 and that are positioned at the area surrounding the first vehicle 10 when the first vehicle 10 is involved in the near miss or the accident, based on the position information and acquisition date-and-time information about the plurality of vehicle 10. Then, based on the vehicle information about the surrounding vehicles, the object vehicle specifying unit 205 specifies a second vehicle 10 that is of the surrounding vehicles and in which the inadequate driving operation causing the near miss or the accident of the first vehicle 10 has been performed.

Thereby, the vehicle monitoring server 20 can know the motion state of the vehicle 10, the driving operation state by the driver, and the like, from the vehicle information acquired by each vehicle 10, and thereby, can detect the occurrence of the near miss (for example, a sudden braking) or accident (for example, a collision) of the vehicle 10. Further, the vehicle monitoring server 20 can extract the surrounding vehicles positioned at the area surrounding the first vehicle 10 when the first vehicle 10 is involved in the near miss or the accident, from the position information (specifically, the position information about the first vehicle 10 and the position information about the other vehicles 10) about each vehicle 10 and the date-and-time information corresponding to the time when the vehicle information is acquired. Therefore, the vehicle monitoring server 20 can know the motion state of the surrounding vehicles, the driving operation state by the driver, and the like, from the extracted vehicle information about the surrounding vehicles, and thereby, can specify the second vehicle 10 in which the inadequate driving operation corresponding to a cause of the near miss or accident of the first vehicle 10 has been performed, from the extracted surrounding vehicles.

In the embodiment, the notice control unit 206 gives the notice of the caution to the user of the second vehicle 10 specified by the object vehicle specifying unit 205, through the user terminal (for example, the navigation device 15 of the second vehicle 10 or the user terminal 40 that is used by the user of the second vehicle 10).

Thereby, the vehicle monitoring server 20 can perform the caution relevant to the inadequate driving operation causing the near miss or accident of the first vehicle 10, to the user of the second vehicle 10 in which the inadequate driving operation has been performed.

In the embodiment, in the case where the second vehicle 10 is traveling, the notice control unit 206 may give the auditory notice to the user that rides in the second vehicle 10, through the in-vehicle device (navigation device 15) of the second vehicle 10 or the mobile terminal (user terminal 40) possessed by the user as the user terminal, and in the case where the second vehicle 10 is at a standstill, the notice control unit 206 may give the visual notice to the user that rides in the second vehicle 10, through the in-vehicle device of the second vehicle 10 or the mobile terminal possessed by the user.

Thereby, the vehicle monitoring server 20 can give the auditory notice to the user of the second vehicle during traveling, so as not to obstruct the driving operation, and can give the visual notice to the user of the second vehicle at a standstill, so as to perform a more specific caution.

In the embodiment, in the case where the second vehicle 10 is in the stop state, the notice control unit 206 may give the notice of the caution to the user of the second vehicle 10, through the user terminal (user terminal 40) different from the in-vehicle device of the second vehicle 10.

Thereby, the vehicle monitoring server 20 can perform the caution relevant to the inadequate driving operation to the user of the second vehicle, at such a timing that the driving operation of the second vehicle is not obstructed.

In the embodiment, the accident/near miss detecting unit 203 successively perform the detection of the first vehicle in response to the movement of the plurality of vehicles, and the surrounding vehicle extracting unit 204 and the object vehicle specifying unit 205 respectively perform the extraction of the surrounding vehicles and the specification of the second vehicle, immediately in response to the detection of the first vehicle by the accident/near miss detecting unit 203. In response to the specification of the second vehicle by the object vehicle specifying unit 205, the notice control unit 206 may give the auditory notice to the user that rides in the second vehicle 10, through the in-vehicle device (navigation device 15) of the second vehicle 10 or the mobile terminal (user terminal 40) possessed by the user as the user terminal at a first timing that is a relatively early timing after the first vehicle is involved in the near miss or the accident, and then may give the visual notice to the user that rides in the second vehicle 10, through the in-vehicle device of the second vehicle 10 or the mobile terminal possessed by the user, at a second timing that is a relatively late timing at which the second vehicle 10 is at a standstill.

Thereby, the vehicle monitoring server 20 can perform a simplified caution to the user (driver) of the second vehicle, shortly after the accident or the near miss, even during traveling, and can perform a specific caution later, in the state where the second vehicle is at a standstill.

In the embodiment, in the case where it is determined that the user is not looking at the content of the notice (detailed caution notice) at the second timing, the notice control unit 206 may give the notice of the caution to the user through the user terminal (user terminal 40) different from the in-vehicle device of the second vehicle 10, when the second vehicle 10 gets into the stop state.

Thereby, even in the case where the user is not looking at the content of the notice of the caution during the driving of the second vehicle 10, the vehicle monitoring server 20 can perform again the specific caution to the user of the second vehicle 10, through the user terminal (for example, a smartphone) other than the in-vehicle device, after the stop of the second vehicle 10.

The embodiment of the disclosure has been described above in detail. The disclosure is not limited to the particular embodiment, and various modifications and improvements can be made within the scope of the spirit of the disclosure described in the claims.

What is claimed is:

1. An information processing device comprising:
   circuitry configured to:
   detect a first vehicle of a plurality of vehicles based on vehicle information, the first vehicle being involved in a near miss or an accident, the vehicle information being acquired by each of the plurality of vehicles and including position information;
   extract information of surrounding vehicles of the plurality of vehicles based on the position information and date-and-time information, the date-and-time information corresponding to a time when the vehicle information is acquired by the plurality of vehicles, and the surrounding vehicles being positioned at an area surrounding the first vehicle when the first vehicle is involved in the near miss or the accident;
   specify a second vehicle of the surrounding vehicles based on the vehicle information about the surrounding vehicles, the second vehicle being a vehicle in which a driving operation causing the near miss or the accident of the first vehicle is performed;
   give a first notice of a caution regarding the near miss or the accident to a user of the second vehicle through a user terminal, the first notice of the caution including a simplified notice that is simpler in detail than a detailed notice; and
   when a condition is satisfied, give a second notice of a caution regarding the near miss or the accident to the user of the second vehicle through the user terminal after giving the first notice, the second notice of the caution including the detailed notice and including more information on a cause of the near miss or the accident than the first notice of caution.

2. The information processing device according to claim 1, wherein the circuitry is configured to:
   in a case where the second vehicle is traveling, give an auditory notice of the caution to the user of the second vehicle through the user terminal, the user terminal being an in-vehicle device equipped in the second vehicle or a mobile terminal possessed by the user, and
   in a case where the second vehicle is at a standstill, give a visual notice of the caution to the user through the in-vehicle device or the mobile terminal.

3. The information processing device according to claim 1, wherein the circuitry is configured to, in a case where the second vehicle is in a stop state, give the first notice of the caution to the user of the second vehicle through the user terminal, which is different from an in-vehicle device equipped in the second vehicle.

4. The information processing device according to claim 1, wherein the circuitry is configured to:
   perform the detection of the first vehicle immediately in response to movement of the plurality of vehicles;
   perform the extraction of the surrounding vehicles and the specification of the second vehicle immediately in response to the detection of the first vehicle; and
   in response to the specification of the second vehicle:
   give an auditory notice of the caution to the user of the second vehicle through the user terminal at a first timing that is a relatively early timing after the first vehicle is involved in the near miss or the accident, the user terminal being an in-vehicle device equipped in the second vehicle or a mobile terminal possessed by the user, and then give a visual notice of the caution to the user of the second vehicle, through the in-vehicle device or the mobile terminal, at a second timing that is a relatively late timing relative to the relatively early timing at which the second vehicle is at a standstill.

5. The information processing device according to claim 4, wherein the circuitry is configured to, in a case where it is determined that the user is not looking at a content of the visual notice at the second timing, give the visual notice to the user through the user terminal, which is different from the in-vehicle device of the second vehicle, when the second vehicle gets into an ignition-OFF state.

6. The information processing device according to claim 1, wherein the circuitry is configured to:

give the first notice of the caution to the user through an-vehicle device equipped in the second vehicle when the second vehicle is not in a stopped state, and give the first notice of the caution to the user through a mobile terminal possessed by the user when the second vehicle is in the stopped state.

7. The information processing device according to claim 6, wherein the stopped state is an ignition-OFF state.

8. The information processing device according to claim 7, wherein the circuitry is configured to:

give the simplified notice to the user through the in-vehicle device when the second vehicle is not in the stopped state and is traveling, and give the detailed notice to the user through the in-vehicle device when the second vehicle is not in the stopped state and is at a standstill.

9. The information processing device according to claim 1, wherein the circuitry is configured to:

give the simplified notice to the user through an-vehicle device equipped in the second vehicle when the second vehicle is not in an ignition-OFF state and is traveling, and give the detailed notice to the user through the in-vehicle device when the second vehicle is not in the ignition-OFF state and is at a standstill.

10. An information processing method that is executed by an information processing device, the information processing method comprising:

detecting a first vehicle of a plurality of vehicles based on vehicle information, the first vehicle being involved in a near miss or an accident, the vehicle information being acquired by each of the plurality of vehicles and including position information;

extracting information of surrounding vehicles of the plurality of vehicles based on the position information and date-and-time information corresponding to a time when the vehicle information is acquired by the plurality of vehicles, the surrounding vehicles being positioned at an area surrounding the first vehicle when the first vehicle is involved in the near miss or the accident;

specifying a second vehicle of the surrounding vehicles based on the vehicle information about the surrounding vehicles, the second vehicle being a vehicle in which a driving operation causing the near miss or the accident of the first vehicle is performed;

giving a first notice of a caution regarding the near miss or the accident to a user of the second vehicle through a user terminal, the first notice of the caution including a simplified notice that is simpler in detail than a detailed notice; and when a condition is satisfied, giving a second notice of a caution regarding the near miss or the accident to the user of the second vehicle through the user terminal after giving the first notice, the second notice of the caution including the detailed notice and including more information on a cause of the near miss or the accident than the first notice of caution.

11. A non-transitory computer readable medium storing a program that causes an information processing device to execute:

detecting a first vehicle of a plurality of vehicles based on vehicle information, the first vehicle being involved in a near miss or an accident, the vehicle information being acquired by each of the plurality of vehicles and including position information;

extracting information of surrounding vehicles of the plurality of vehicles based on the position information and date-and-time information corresponding to a time when the vehicle information is acquired by the plurality of vehicles, the surrounding vehicles being positioned at an area surrounding the first vehicle when the first vehicle is involved in the near miss or the accident;

specifying a second vehicle of the surrounding vehicles based on the vehicle information about the surrounding vehicles, the second vehicle being a vehicle in which a driving operation causing the near miss or the accident of the first vehicle is performed;

giving a first notice of a caution regarding the near miss or the accident to a user of the second vehicle through a user terminal, the first notice of the caution including a simplified notice that is simpler in detail than a detailed notice; and when a condition is satisfied, giving a second notice of a caution regarding the near miss or the accident to the user of the second vehicle through the user terminal after giving the first notice, the second notice of the caution including the detailed notice and including more information on a cause of the near miss or the accident than the first notice of caution.

* * * * *